US005963223A

United States Patent [19]
Tateyama et al.

[11] Patent Number: 5,963,223
[45] Date of Patent: Oct. 5, 1999

[54] RECORDING APPARATUS CAPABLE OF AUTOMATICALLY RE-WRITING RECORDING DATA

[75] Inventors: Jiro Tateyama, Yokohama; Yuichi Watanabe, Machida, both of Japan

[73] Assignee: Canon Kabushiki Kaisha, Tokyo, Japan

[21] Appl. No.: 08/907,474

[22] Filed: Aug. 11, 1997

Related U.S. Application Data

[63] Continuation of application No. 08/233,726, Apr. 26, 1994, abandoned, which is a continuation of application No. 07/910,539, Jul. 8, 1992, abandoned.

[30] Foreign Application Priority Data

Jul. 12, 1991 [JP] Japan .................................... 3-172307

[51] Int. Cl.[6] ........................................................ G01D 9/00
[52] U.S. Cl. ........................................................... 346/33 R
[58] Field of Search .................................... 347/3, 12, 14; 346/33 R; 395/115, 116

[56] References Cited

U.S. PATENT DOCUMENTS

| | | | |
|---|---|---|---|
| 3,568,153 | 3/1971 | Kurtz et al. | 371/40.2 |
| 4,048,625 | 9/1977 | Harris et al. | 395/115 |
| 4,069,486 | 1/1978 | Fox | 346/75 |
| 4,313,124 | 1/1982 | Hara | 347/57 |
| 4,345,262 | 8/1982 | Shirato et al. | 347/10 |
| 4,463,359 | 7/1984 | Ayata et al. | 347/56 |
| 4,485,386 | 11/1984 | Dagna et al. | 346/75 |
| 4,723,129 | 2/1988 | Endo et al. | 347/56 |
| 4,740,796 | 4/1988 | Endo et al. | 347/56 |
| 4,963,989 | 10/1990 | Morton | 358/298 |
| 4,978,971 | 12/1990 | Goetz et al. | 347/5 |

*Primary Examiner*—N. Le
*Assistant Examiner*—Judy Nguyen
*Attorney, Agent, or Firm*—Fitzpatrick, Cella, Harper & Scinto

[57] ABSTRACT

A recording apparatus capable of automatically re-writing recording data includes a recording head for recording images on a recording medium in accordance with recording data; a memory for storing recording data to be supplied to the recording head; an address generating device which generates, with respect to the memory, addresses synchronized with recording performed by the recording head and which reads out the recording data stored in the memory; and a data writing device for writing predetermined data in the memory on the basis of the addresses which have been generated by the address generating device and from which the recording data has been read.

37 Claims, 11 Drawing Sheets

RECORDING APPARATUS CAPABLE OF AUTOMATICALLY RE-WRITING RECORDING DATA

This application is a continuation of application Ser. No. 08/233,726 filed Apr. 26, 1994, now abandoned, which is a continuation of application Ser. No. 07/910,539 filed Jul. 8, 1992, abandoned.

BACKGROUND OF THE INVENTION

1. Field of the Invention

The present invention relates to a recording apparatus which is capable of automatically re-writing recording data.

2. Description of the Related Art

In a serial printer, a carriage carrying a recording head reciprocates perpendicularly to the feeding path of the recording medium, which includes paper, an OHP sheet, or the like. Printers of this type proposed up to the present have been provided with various types of recording heads adapted to record on different systems. In the case of a printer of the type which forms images by using a dot matrix, the recording head may be of a wire-dot type, thermal type, thermal transfer type, ink jet type, etc.

In printers of this type, the main control section of a single CPU has conventionally executed the operation of developing a character code into dot data and transferring the same to the recording head for the purpose of moving the carriage or performing recording. In the case of recording at a considerably high speed, a single CPU cannot manage the above process. In view of this, various methods for improving the processing speed have been proposed. According to one method, the processing speed is improved by providing a mass storage memory which stores printing data obtained by developing beforehand character codes corresponding to a plurality of lines. In another method, an improvement in speed is attained by performing a parallel processing with a plurality of CPUs.

However, the provision of a mass storage memory or additional CPUs makes the printer system rather expensive.

SUMMARY OF THE INVENTION

The present invention has been made with a view toward eliminating the above problem in the related art. It is accordingly an object of this invention to provide a recording apparatus which helps to attain an improvement in recording speed without any increase in costs.

Another object of the present invention is to provide a recording apparatus which can write predetermined data automatically in a buffer memory.

Still another object of the present invention is to provide a recording apparatus which is capable of automatically clearing those areas of the buffer memory in which reading has been completed.

To achieve the above objects, there is provided, in accordance with the present invention, a recording apparatus comprising:

a recording head for recording images on a recording medium in accordance with recording data;

a memory for storing the recording data to be supplied to the recording head;

an address generating device which generates, with respect to the memory, addresses synchronized with recording performed by the recording head and which reads out the recording data stored in the memory; and a data writing device for writing predetermined data in the memory on the basis of the addresses which have been generated by the address generating section and from which the recording data has been read.

Further, in accordance with the present invention, the above objects can be achieved by a recording controller which supplies recording data to a recording head, the controller comprising:

a buffer memory for storing the recording data;

an address counter for generating addresses corresponding to recording positions with respect to the buffer memory;

a read-out circuit for generating read-out signals and for reading the recording data from the buffer memory in accordance with the addresses generated by the address counter;

an output circuit for supplying the recording data read out by the read-out circuit to the recording head; and a writing section for generating writing signals and for writing predetermined data in the buffer memory on the basis of the addresses which have been generated by the address counter and from which the recording data has been read.

Still further, in accordance with the present invention, the above objects can be achieved by a recording method in which images are recorded on a recording medium with a recording head, the method comprising the steps of:

supplying addresses sequentially to a buffer memory for storing recording data;

reading the recording data from the buffer memory on the basis of the addresses sequentially supplied;

supplying the read recording data to the recording head to perform recording on the recording medium; and writing predetermined data in the buffer memory in accordance with addresses which are the same as the addresses sequentially supplied.

Further, in accordance with the present invention, printing data is transferred from a one-line buffer RAM to the recording head while address increment is being effected, and clear is written to the buffer RAM in correspondence with the addresses of the transferred printing data, thereby making it possible to perform high-speed printing even with a control using a single CPU.

DETAILED DESCRIPTION OF THE PREFERRED EMBODIMENTS

Embodiments of the present invention will now be described in detail with reference to the accompanying drawings.

(First Embodiment)

Figure 1:
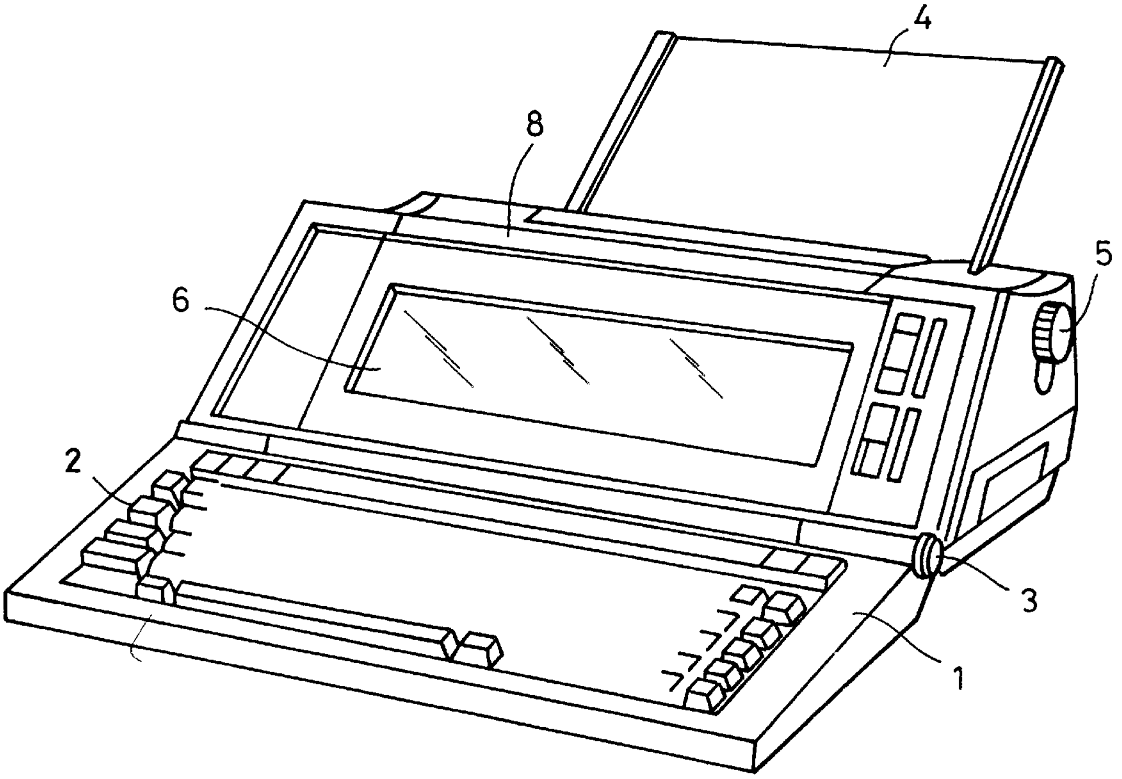
FIGS. 1 and 2 are external perspective views of an electronic typewriter as an apparatus related to an embodiment of the present invention.
Figure 2:
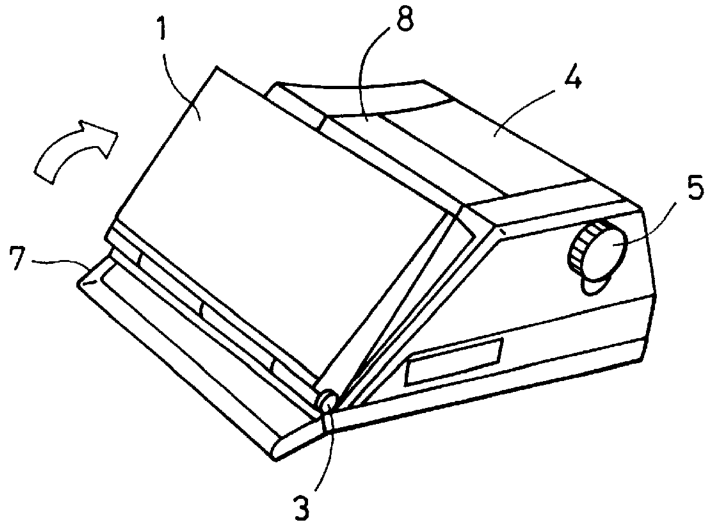

FIGS. 1 and 2 show an external view of an electronic typewriter as an example of an apparatus to which the present invention can be applied. Numeral 1 indicates a keyboard section, in which a group of keys 2 are arranged. The group of keys 2 include character input keys for entering characters, numbers or the like, and control keys. When the typewriter is not used, the keyboard section 1 can be folded back as shown in FIG. 2 by rotating it on a hinge 3. Numeral 4 indicates a paper feed tray for feeding a recording medium in the form of sheets into a printer section 8 inside the apparatus. When the typewriter is not being used, this paper feed tray is likewise folded up so as to cover the printer section 8, as shown in FIG. 2. Numeral 5 indicates a feeding knob for manually setting or discharging the recording medium; numeral 6 indicates a display section for displaying an input text or the like; and numeral 7 indicates a handle used when the apparatus of this embodiment is carried about.

Figure 3:
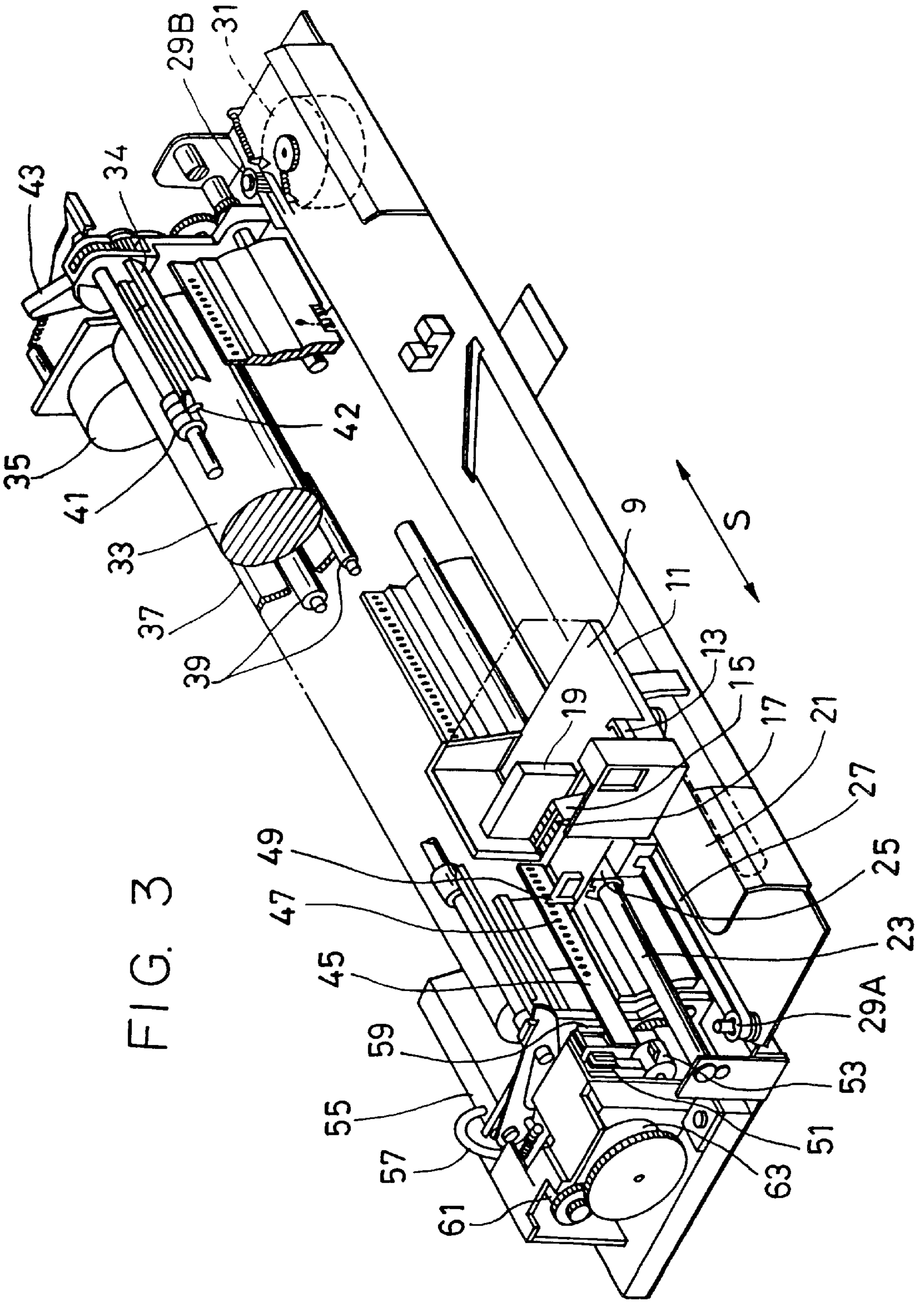
FIG. 3 is a perspective view showing an example of the construction of a printer to be installed in the electronic typewriter shown in FIGS. 1 and 2.

FIG. 3 shows an example of the construction of the printer section of this embodiment. Numeral 9 indicates a head cartridge, which will be described in detail below with reference to FIGS. 4 through 6. Numeral 11 indicates a carriage which carries the head cartridge 9 so that scanning in the direction indicated by the arrow S in the drawing can be performed. Numeral 13 indicates a hook for attaching the head cartridge 9 to the carriage 11, and numeral 15 indicates a lever for operating the hook 13. Provided on the lever 15 is a marker 17 for indicating a scale provided on a cover described below so as to make it possible to read the printing position, set position, etc. of the head cartridge of the recording head. Numeral 19 indicates a support plate for supporting an electrical connection section for the head cartridge 9. Numeral 21 indicates a flexible cable for connecting this electrical connection section to a main body control section.

Numeral 23 indicates a guide shaft for guiding the carriage 11 in the direction S. The guide shaft 23 is inserted into a bearing 25 of the carriage 11. Numeral 27 indicates a timing belt which is firmly attached to the carriage 11 and which serves to transmit the force for moving the carriage 11 in the direction S. The timing belt 27 is stretched between pulleys 29A and 29B arranged on either side of the apparatus. The driving force is transmitted from a motor 31 to a pulley 29B through a transmission mechanism such as a gear.

Numeral 33 indicates a feeding roller for controlling the recording surface of the recording medium (hereinafter also referred to as "recording paper") and feeding the same when recording or the like is performed. The feeding roller 33 is driven by a feeding motor 35. Numeral 37 indicates a paper pan for guiding the recording medium to the recording position from the side of the paper feed tray 4, and numeral 39 indicates feed rollers arranged in the feeding path of the recording medium and serving to feed the recording medium while pressing the same against the feeding roller 33. Numeral 34 indicates a platen which is arranged in such a manner as to face the surface of the cartridge 9 having ejection nozzles and which serves to control the recording surface of the recording medium. Numeral 41 indicates a paper discharge roller which is arranged in the recording medium feeding path on the downstream side of the recording position and which serves to discharge the recording medium toward a discharge outlet (not shown). Numeral 42 indicates a spur provided so as to face the roller 41. The spur 42 is pressed against the paper discharge roller 41 through the intermediation of the recording medium, thereby generating a feeding force due to the paper discharge roller 41. Numeral 43 indicates a release lever for releasing the biasing of the feed roller 39, a presser plate 45 and the spur 42.

The presser plate 45 prevents that portion of the recording medium near the recording position, for example, from rising and allows it to be held in close contact with the feeding roller 33. This embodiment employs an ink-jet recording head which records by ejecting ink. Accordingly, the distance between the nozzled surface of the recording head and the recording surface of the recording medium is relatively small. This distance must be strictly controlled so as to avoid contact between the nozzled surface of the recording head and the recording surface of the recording medium, and the provision of the presser plate 45 is effective in preventing such contact. Numeral 47 indicates a scale provided on the presser plate 45, and numeral 49 indicates a marker provided on the carriage 11 so as to face this scale. The scale 47 and the marker 49 also make it possible to read the printing position, set position, etc. of the recording head.

Numeral 51 indicates a cap located so as to be opposite to the nozzled surface of the recording head at a home position. The cap 51 is formed of an elastic material such as rubber and is supported in such a way as to be capable of abutting against and moving away from the recording head. The cap 51 is used to protect the recording head when no recording is being performed or in conjunction with an ejection restoring operation for the recording head. The ejection restoring operation is an operation for removing factors causing defective ejection. It is performed by driving energy generating elements, which are provided inside the ink ejection nozzles and utilized for the ejection of ink. These energy generating elements are driven to clear all the ejection nozzles of ink, thereby removing factors causing defective ejection, such as the portion of ink which has become unsuitable for recording due to bubbles, dust, thickening, or the like (preliminary discharge). Apart from this, some ink may be forcibly discharged from the ejection nozzles so as to remove factors causing defective ejection.

Numeral 53 indicates a pump which provides a suction force for forcibly discharging ink and which serves to suck up the ink received by the cap 51 at the time of the ejection restoring operation by such a forced discharge as mentioned above or by preliminary discharge. Numeral 55 indicates an exhaust ink tank for storing the exhaust ink sucked up by the pump 53, and numeral 57 indicates a tube which allows the pump 53 and the exhaust ink tank 55 to communicate with each other.

Numeral 59 indicates a blade for wiping the nozzled surface of the recording head. The blade is supported in such a way as to be capable of moving between a position where it protrudes toward the recording head side to perform wiping as the head moves along and a retracted position where it does not engage the nozzled surface of the head. Numeral 61 indicates a motor, and numeral 63 indicates a cam device which receives the driving force transmitted from the motor 61 so as to drive the pump 53 and move the cap 51 and the blade 59.

Next, the head cartridge 9, mentioned above, will be described in detail.

Figure 4:
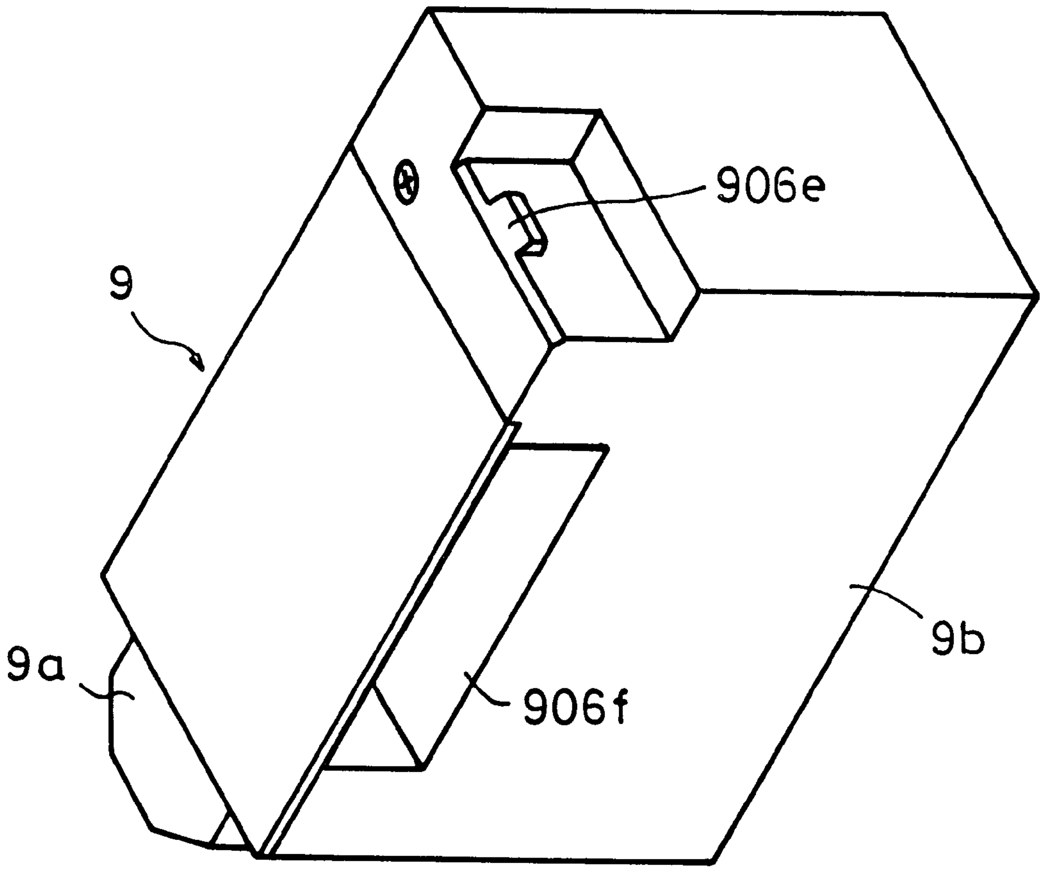
FIG. 4 is an external perspective view of the head cartridge shown in FIG. 3.

FIG. 4 is an external perspective view of the head cartridge 9 formed as one unit composed of an ejection unit 9*a*, which constitute the main body of the ink jet recording head, and an ink tank 9*b*. In the drawing, numeral 906*e* indicates a claw adapted to engage with the hook 13 of the carriage 11 when the head cartridge 9 is attached to the carriage 11. As is apparent from the drawing, the claw 906*e* is arranged within the total length of the recording head. Further, provided in the proximity of the ejection unit 9*a*, which is situated in the front section of the head cartridge 9, is an abutting section (not shown) for positioning the head cartridge 9. Numeral 906*f* indicates a head opening into which support plate 19 is inserted. The support plate 19 protrudes upwards from the carriage 11 and serves to support a flexible board (the electrical connection section) and a rubber pad.

Figure 5:
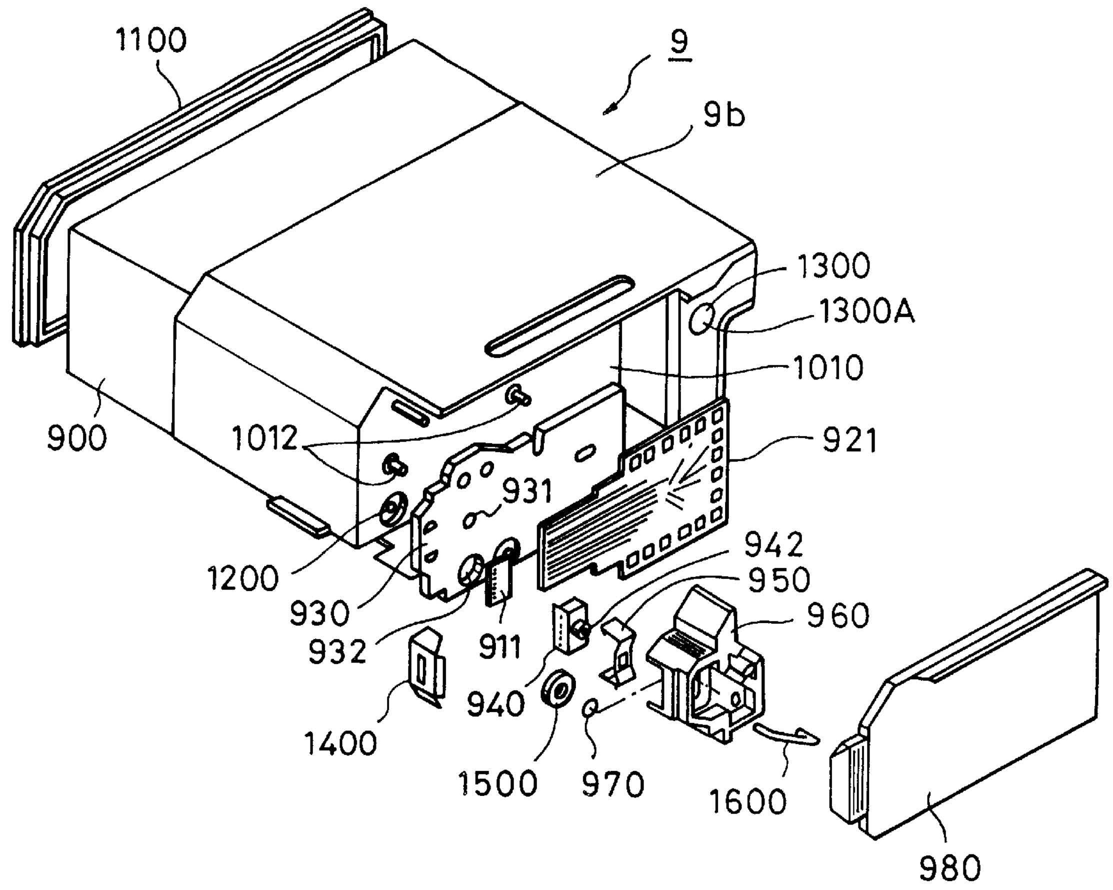
FIGS. 5 and 6 are perspective views of the head cartridge shown in FIG. 4.
Figure 6:
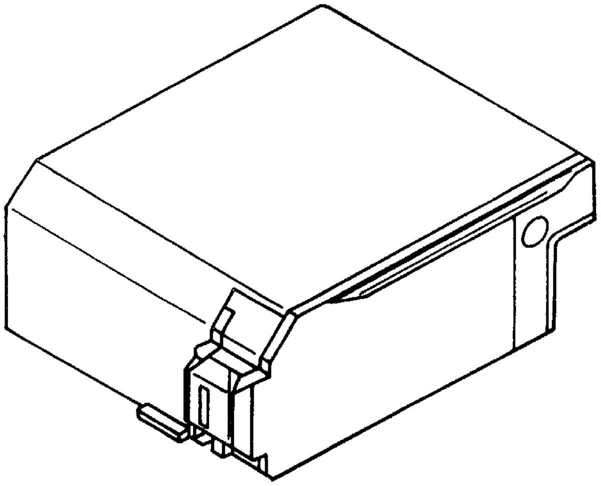

FIGS. 5 and 6 are exploded perspective views of the head cartridge shown in FIG. 4. As stated above, the cartridge shown is a replaceable type which is integrated with an ink container section serving as the ink source.

In FIG. 5, numeral 911 indicates a heater board composed of at least one electrothermal conversion element (an ejection heater) and an Al wiring system or the like for supplying power to this element. Both the electrothermal conversion element and wiring system are formed on an Si substrate by a film formation technique. Numeral 921 indicates a wiring board for the heater board 911. Wiring systems corresponding to each other are connected, for example, by wire bonding. Numeral 940 indicates a top plate in which partitions for defining an ink flow passage, a common liquid chamber, etc. are provided. In this embodiment, the top plate 940 is formed of a resin material and integrated with an orifice plate section.

Numeral 930 indicates a support member made of, for example, metal, and numeral 950 indicates a pressure spring. The support member 930 and the pressure spring 950 are engaged with each other, with the heater board 911 and the top plate 940 being held therebetween, thus fixing the heater board 911 and the top plate 940 to each other by virtue of the biasing force of the pressure spring 950. Also attached to the support member 930 by adhesion or the like are the wiring board 921, etc. The support member 930 may have a positioning index with respect to the carriage 11 for performing head scanning. The support member 930 also serves as a member for diffusing the heat of the heater board 911 generated as a result of driving.

Numeral 960 indicates a supply tank, which is supplied with ink from the ink reserving section 9*b* serving as the ink supply source. The supply tank 960 functions as a sub-tank for guiding ink to a common liquid chamber defined by joining the heater board 911 and the top plate 940 to each other. Numeral 970 indicates a filter arranged at a position inside the feeding tank 960 near the ink feeding port leading to the common liquid chamber, and numeral 980 indicates a cover member for the feeding tank 960.

Numeral 900 indicates an absorptive member for soaking up ink. The member 900 is arranged inside the ink tank 9*b*.

Numeral 1200 indicates a feeding port through which ink is supplied to the recording element (the ejection unit) 9*a*, which is composed of the above-described components 911 to 980. Ink is injected into the ink tank 96 through the supply port 1200 before the recording element 9*a* is attached to a section 1010 of the main body of the ink tank 9*b*, thereby impregnating the absorptive member 900 with ink.

Numeral 1100 indicates a cover member for the cartridge main body, and numeral 1300 indicates an atmospheric communication hole which allows the interior of the cartridge to communicate with the atmosphere. Numeral 1300A indicates a liquid-repellent member arranged on the inner side of the atmospheric communication hole 1300. This member prevents ink leakage through the atmospheric communication hole 1300.

When the ink tank 9*b* has been filled with ink through the supply port 1200, the ejection unit 9*a*, which is composed of the components 911 to 980, is set in the section 1010. The positioning or fixation of the ejection unit 9*a* is effected, for example, by engaging protrusions 1012 provided on the ink tank main body 9*b* with corresponding holes 931 provided in the support member 930. In this way, the head cartridge 9 shown in FIG. 6 is formed.

Ink is supplied from the interior of the cartridge into the supply tank 960 through the supply port 1200, the hole 932 provided in the support member 930 and an inlet hole provided on the back side (as seen in FIG. 6) of the supply tank 960. After passing through the interior of the supply tank 960, ink flows into the common liquid chamber via an outlet hole through an appropriate feeding pipe and an ink inlet hole 942 provided in the top plate 940. Provided in the joint sections in the above-described ink communication passage are packings formed, for example, of silicone rubber or butyl rubber, so as to effect sealing, thus establishing an ink supply passage.

Figure 7:
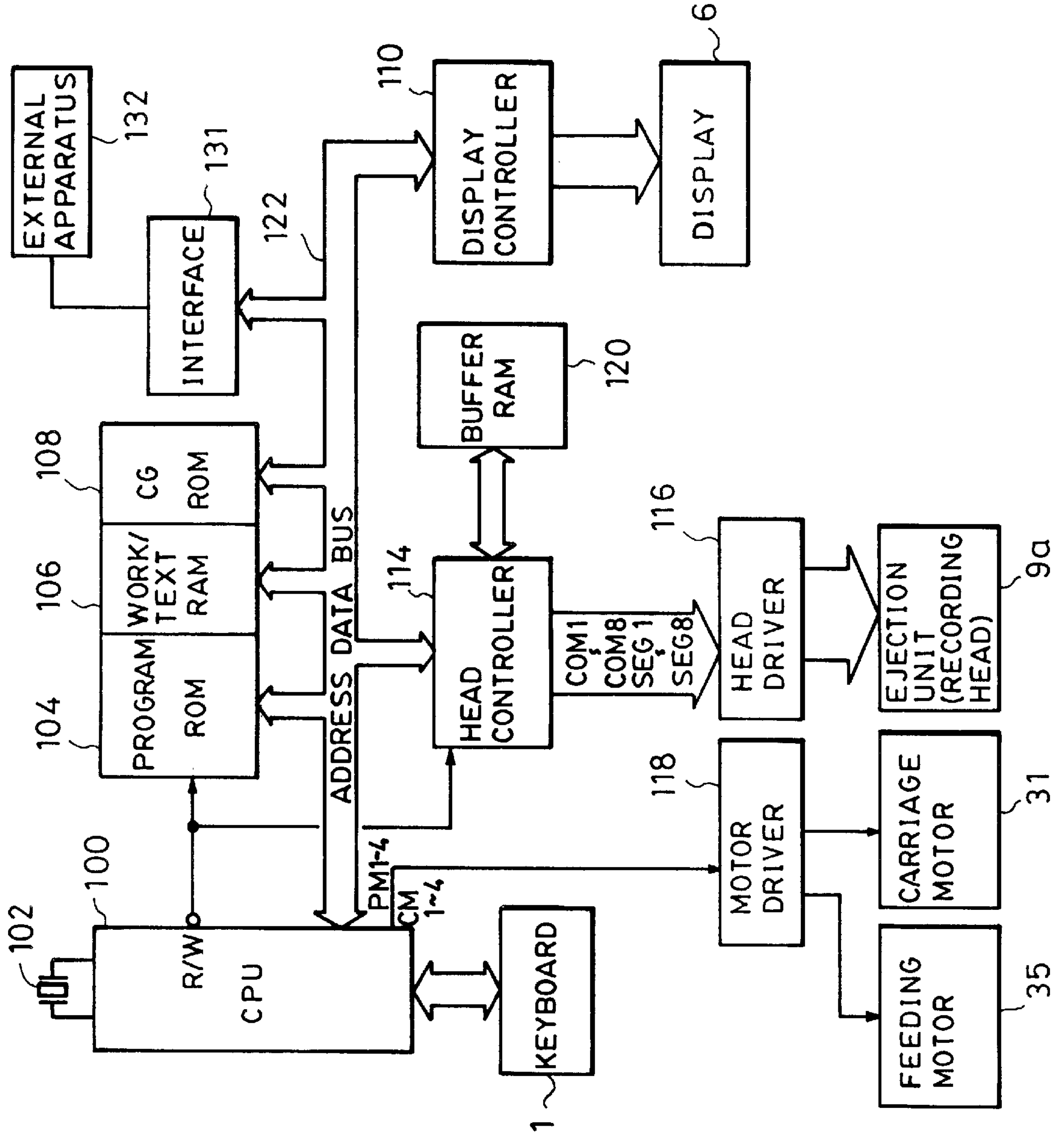
FIG. 7 is a block diagram showing the control system configuration of the electronic typewriter shown in FIG. 1.

FIG. 7 shows the control-system configuration of the character processing apparatus of this embodiment. In the drawing, numeral 100 indicates a microprocessor (CPU) constituting an essential part of the apparatus. The CPU 100 executes predetermined operations in accordance with data, control signals or the like supplied through the keyboard 1. Numeral 102 indicates a quartz vibrator for generating basic clock signals to determine the operational timing for the various parts of the apparatus. Numeral 104 indicates ROM for storing programs for causing the CPU 100 to execute operations and other fixed data; numeral 106 indicates RAM having a work area for operations and a text area for temporarily storing text data; and numeral 108 indicates ROM used as a character generator. Numeral 110 indicates a controller for allowing characters and the like to be displayed on a display 6 which is in the form, for example, of a liquid crystal display. Numeral 114 indicates a head controller, which generates control signals (COM1~COM8 and SEG1~SEG8) for controlling a head driver 116 for driving the ejection-energy generating elements of the recording head. Numeral 118 indicates a motor driver for driving the carriage motor 31 and the feeding motor 35. The motor driver 118 is supplied with driving control signals CM1~CM4 and PM1~PM4 from the CPU 100.

Numeral 120 indicates a buffer RAM for storing one-line of data developed from a character code, data supplied from an external apparatus through an interface, etc. Numeral 122 indicates an address/data bus connecting the above components 104, 106, 108, 100, 114, 110 and 131. Symbol R/W indicates a control signal for enabling a switching between read and write conditions in each section of the system.

Figure 8:
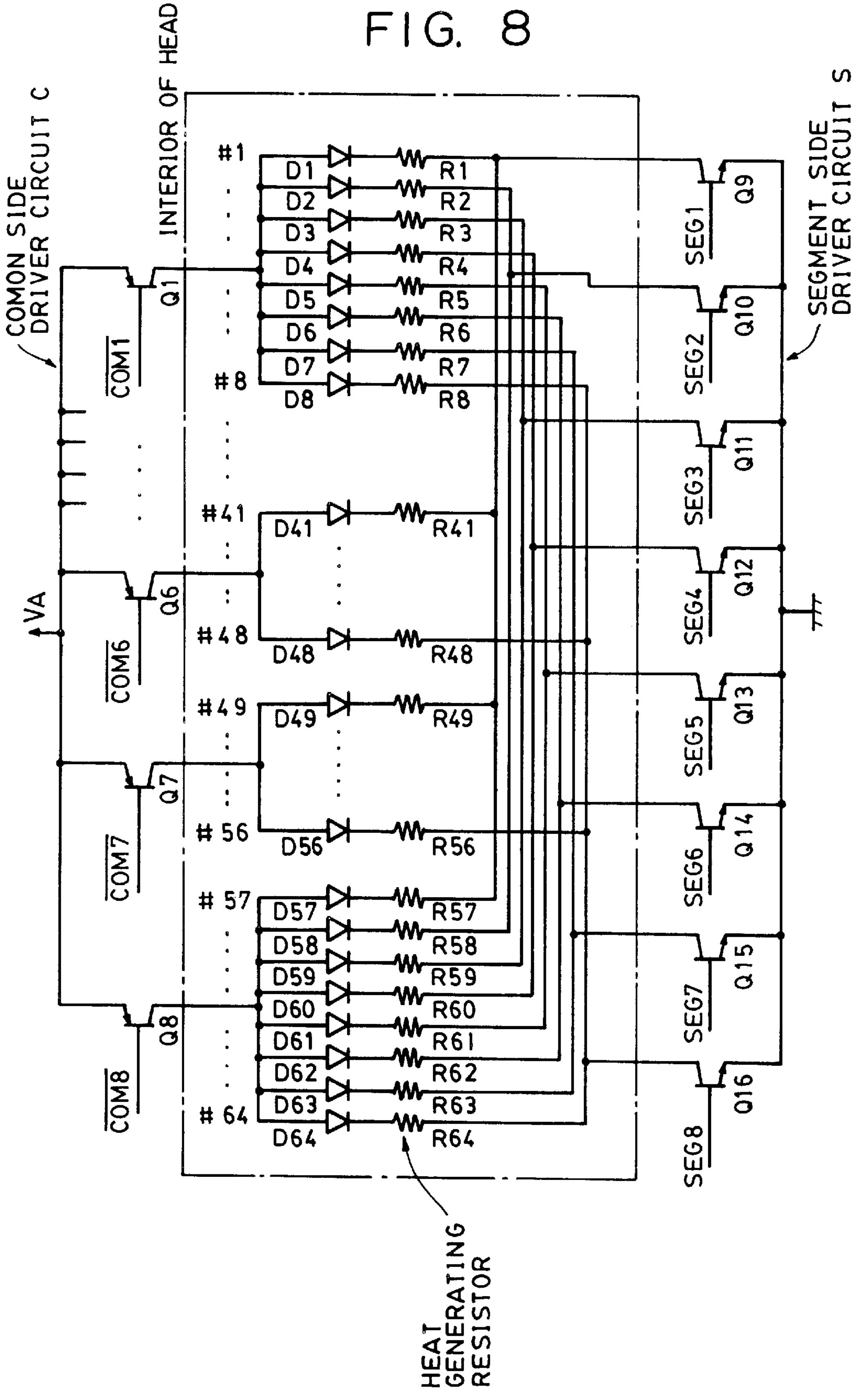
FIG. 8 is a circuit diagram showing an example of the electrical construction of the recording head and the head driver in the printer section of this example.

FIG. 8 shows an example of the electrical construction of the recording head 9*a* and the head driver 116.

In this embodiment, the ejection unit 9*a* has sixty-four ejection nozzles (discharge ports) and numerals #1 through

#64 represent numbers corresponding to the positions of the ejection nozzles provided on the ejection unit 9*a*. Numerals R1 through R64 indicate heat generating resistors which are divided into eight blocks each consisting of eight resistors, with switching transistors Q1 through Q8 in a common-side driver circuit C being connected in common to these blocks. The transistors Q1 through Q8 respectively turn energization paths ON or OFF in accordance with the ON/OFF of control signals $\overline{\text{COM1}}$~$\overline{\text{COM8}}$. Numerals D1 through D64 indicate reverse current preventing diodes arranged in the energization paths to the heat generating resistors R1~R64.

ON/OFF transistors Q9 through Q16 in a segment-side driver circuit S are respectively connected to heat generating resistors at corresponding positions in the respective blocks. The transistors Q9 through Q16 turn ON/OFF the energization paths to the heat generating resistors in correspondence with the ON/OFF of the control signals SEG1 through SEG8.

Figure 9:
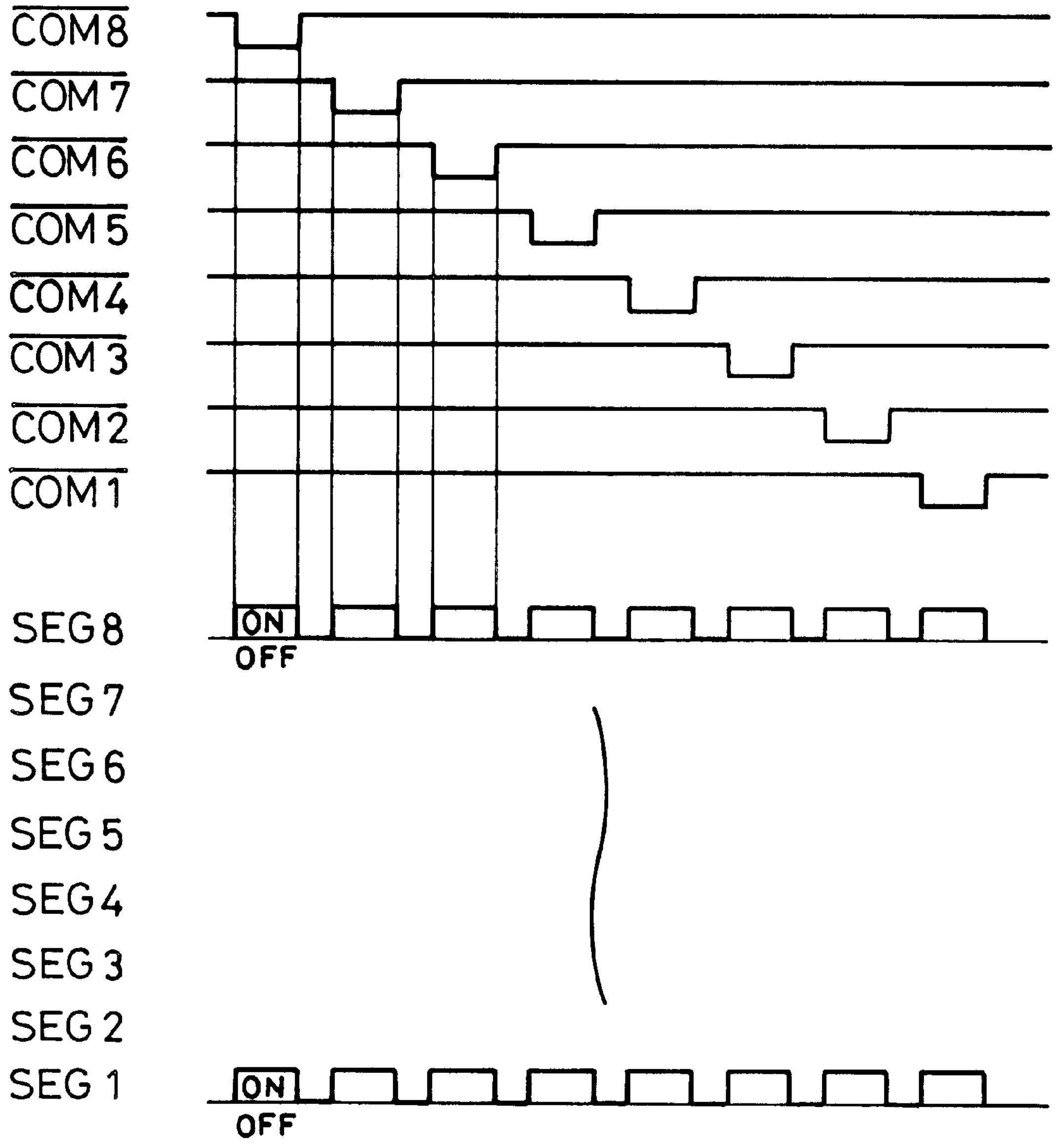
FIG. 9 is a head drive timing chart.

FIG. 9 is a chart showing the head drive timing for the above-described construction. The common-side control signals $\overline{\text{COM1}}$~$\overline{\text{COM8}}$ are sequentially turned ON at fixed positions in the head scanning direction. This turning ON causes one block to be selected and made ready for energization. By turning ON or OFF the segment-side control signals SEG8~SEG1 with respect to the selected block in accordance with the image to be recorded, the heat generating resistors in the block are selectively energized to generate heat, and ink is ejected in correspondence with the heat generation, thus effecting dot recording.

Figure 10:
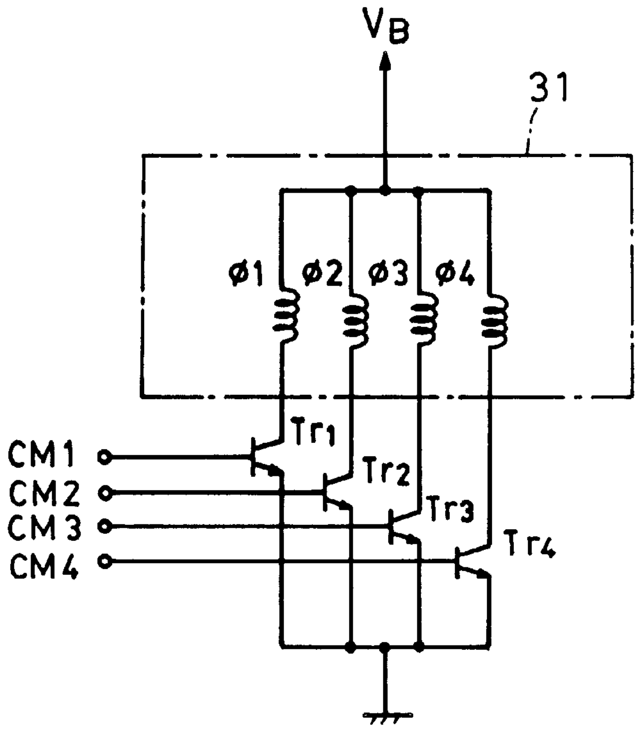
FIG. 10 is a circuit diagram showing an example of the construction of the essential parts of the carriage motor and the motor driver.
Figure 11:
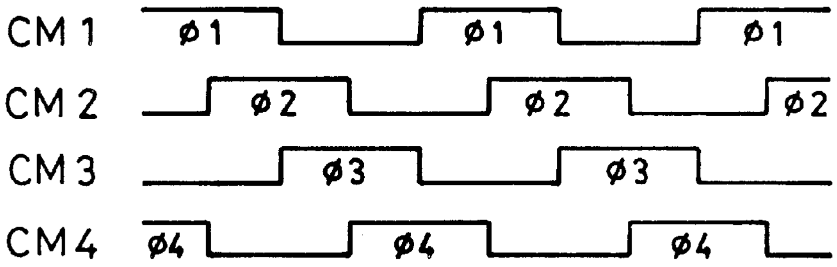
FIG. 11 is a chart showing the drive timing for the carriage motor and the motor driver.

FIG. 10 shows a construction example of the essential part of the carriage motor 31 and that of the motor driver 118, and FIG. 11 shows the drive timing thereof. In this embodiment, a stepping motor having coils Ø1~Ø4 are used as the carriage motor 31. The stepping motor is driven by a two phase excitation system, as shown in FIG. 11, by appropriately turning ON or OFF switching transistors Tr1~Tr4 connected to the coils, in accordance with the drive signals CM1~CM4.

Figure 12:
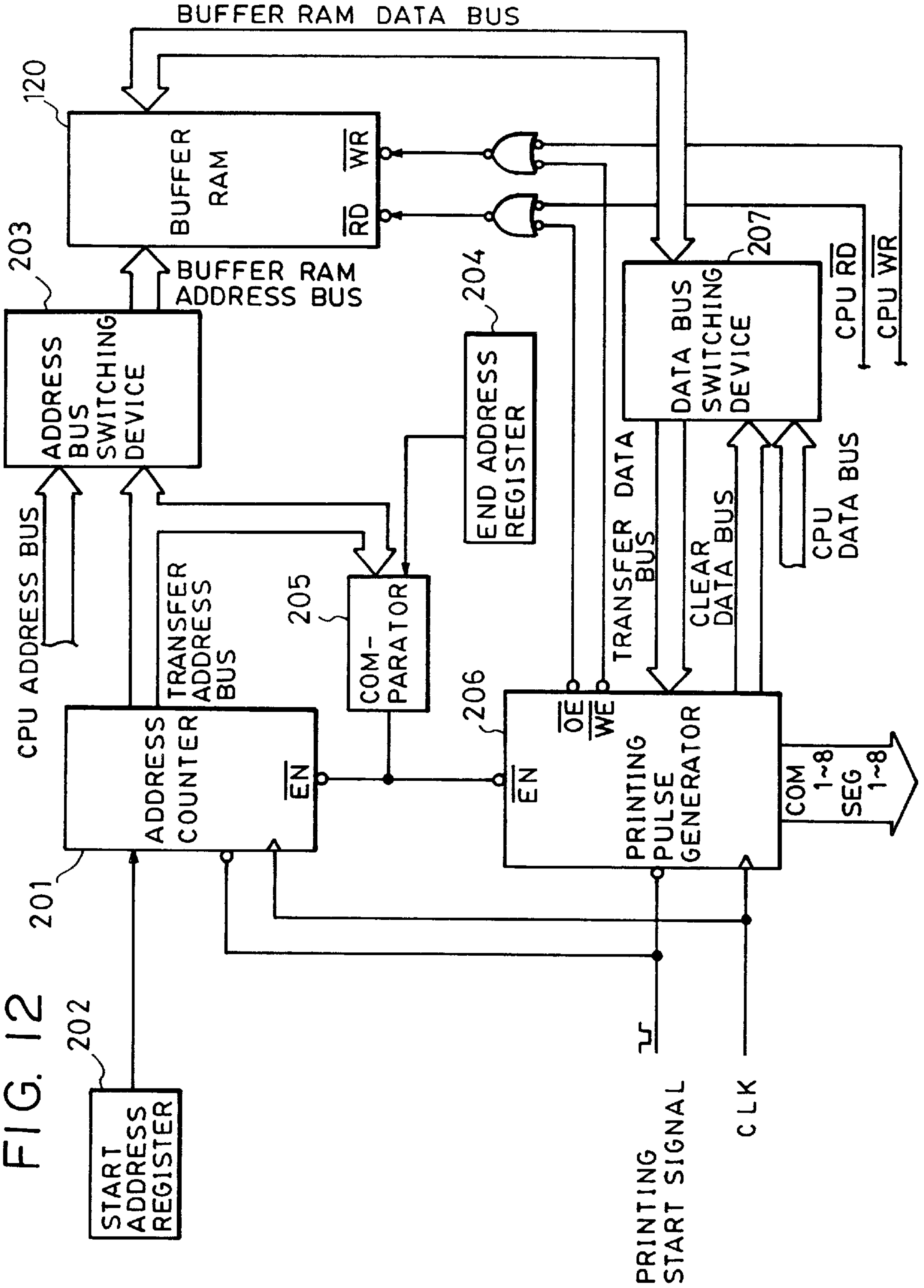
FIG. 12 is a detailed block diagram showing an example of the construction of a head controller.

FIG. 12 is a detailed diagram showing an example of the construction of the head controller 114 in this embodiment. When start address initialization has been effected on a recording data development area stored in a start address register 202, an address counter 201 increments a count value in response to a start signal supplied from the CPU 100 and in accordance with clock signals CLK, and outputs a count value, which indicates the address of the data to be read in the recording data development area, and are supplied to the buffer RAM 120 through an address bus switching device 203. Further, when a comparator 205 detects that an end address value stored in an end address register 204 has matched with the current printing address value, an enable signal EN becomes "High", and the operation of the address counter 201 is stopped.

Further, a printing pulse generator 206 also reads from the buffer RAM 120 transfer data corresponding to the printing address, in response to a start signal from the CPU 100 and in synchronism with the timing of the clock signals CLK, and transmits the drive control signals COM1~8 and SEG 1~8 for the recording head 9*a*. After the transmission of the data, clear data "00" is supplied to the buffer RAM 120 and written thereto through the data bus switching device 207 for the purpose of clearing the same address of the buffer RAM 120. As with the address counter 201, when an end address has been detected by the comparator 205, the enable signal EN becomes "High", and the printing pulse generator 206 stops the signal transmitting operation. The clear data is stored in the printing pulse generator 206. Alternatively, it may be stored in the data register.

The buffer RAM 120 has a capacity corresponding to at least one line of printing development data. By storing one-line of printing data beforehand, it can supply driving signals automatically to the recording head 9*a* in accordance with the start address through the end address generated by the address counter 201.

Regarding the writing of the next-line development data from the CPU 100, the address/data bus is time-division-selected through the switching devices 203 and 207, thereby adjusting the timing with respect to the reading and conversion cycle of the transfer data. That is, regarding the writing of the printing data from the CPU 100, the switching control is effected by the hardware even during printing operation, so that the CPU 100 is not concerned in the writing at all.

Further, since, as described above, the printing pulse generator 206 automatically clears the address at which the development data is read, the CPU 100 can immediately perform the writing of the next-line printing data, thereby attaining an improvement in terms of writing efficiency.

Figure 13A:
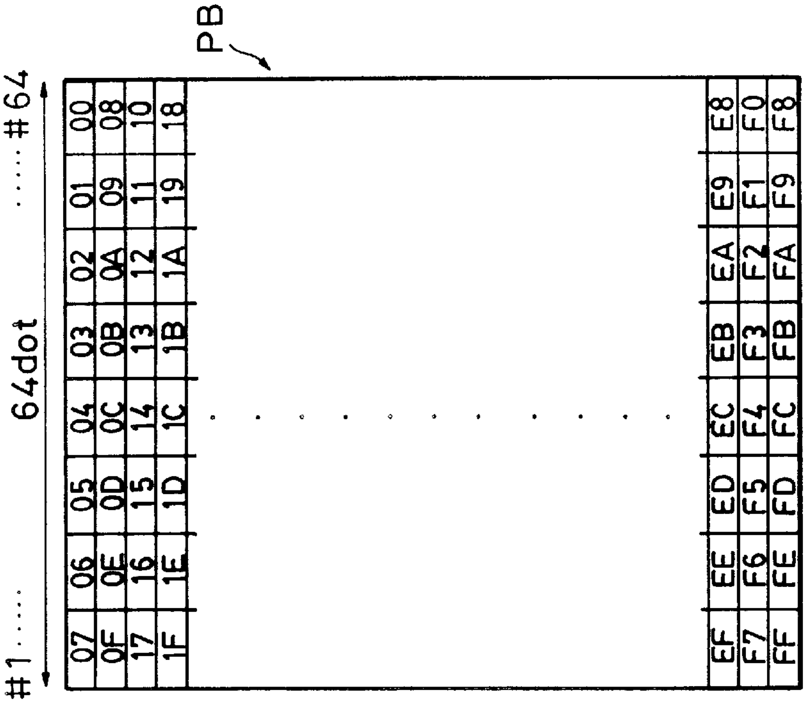
FIG. 13(A) is a diagram illustrating a recording data buffer area.

FIG. 13(A) is a diagram showing an address map in the recording buffer area. Each of the addresses $00~$FF stores 8-bit data, one bit corresponding to one dot of recording data. Accordingly, the number of bits contained in each of the address groups indicated as $00~$07, $08~$0F and $F8~$FF respectively corresponds to the sixty-four dots in the recording element, and corresponds to the ejection nozzle numbers #1~#64 as shown in the drawing. For the sake of simplicity, the drawing only shows $00~$FF although one line of data is developed in the recording data buffer area.

Figure 13B:
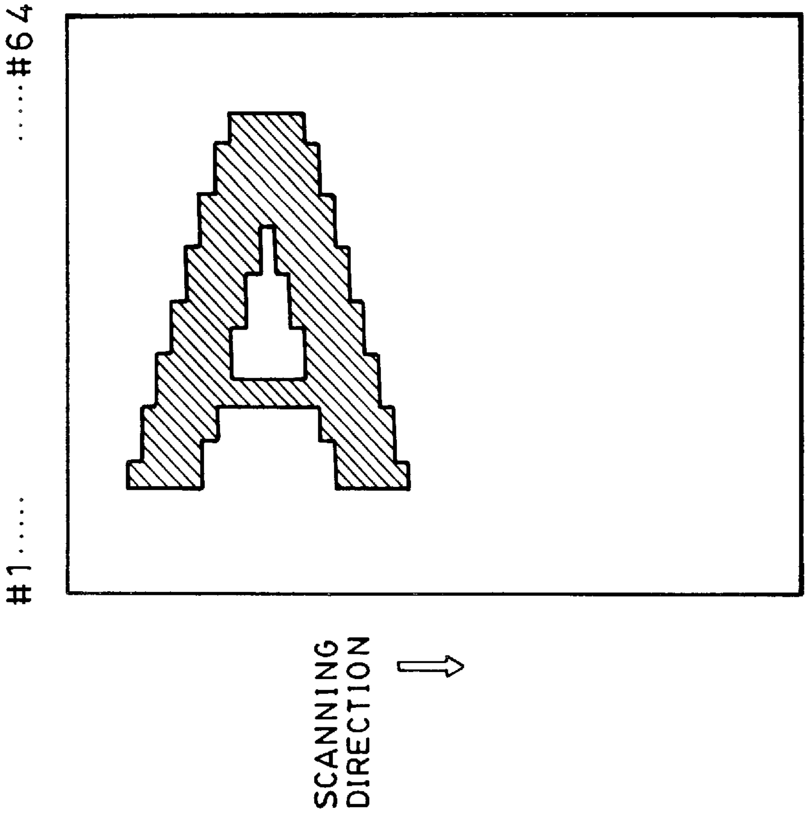
FIG. 13(B) is an example of a character being printed.

FIG. 13(B) shows an example in which a character "A" is printed. By causing the recording head to scan from the left to the right, the character "A" is printed.

Figure 14:
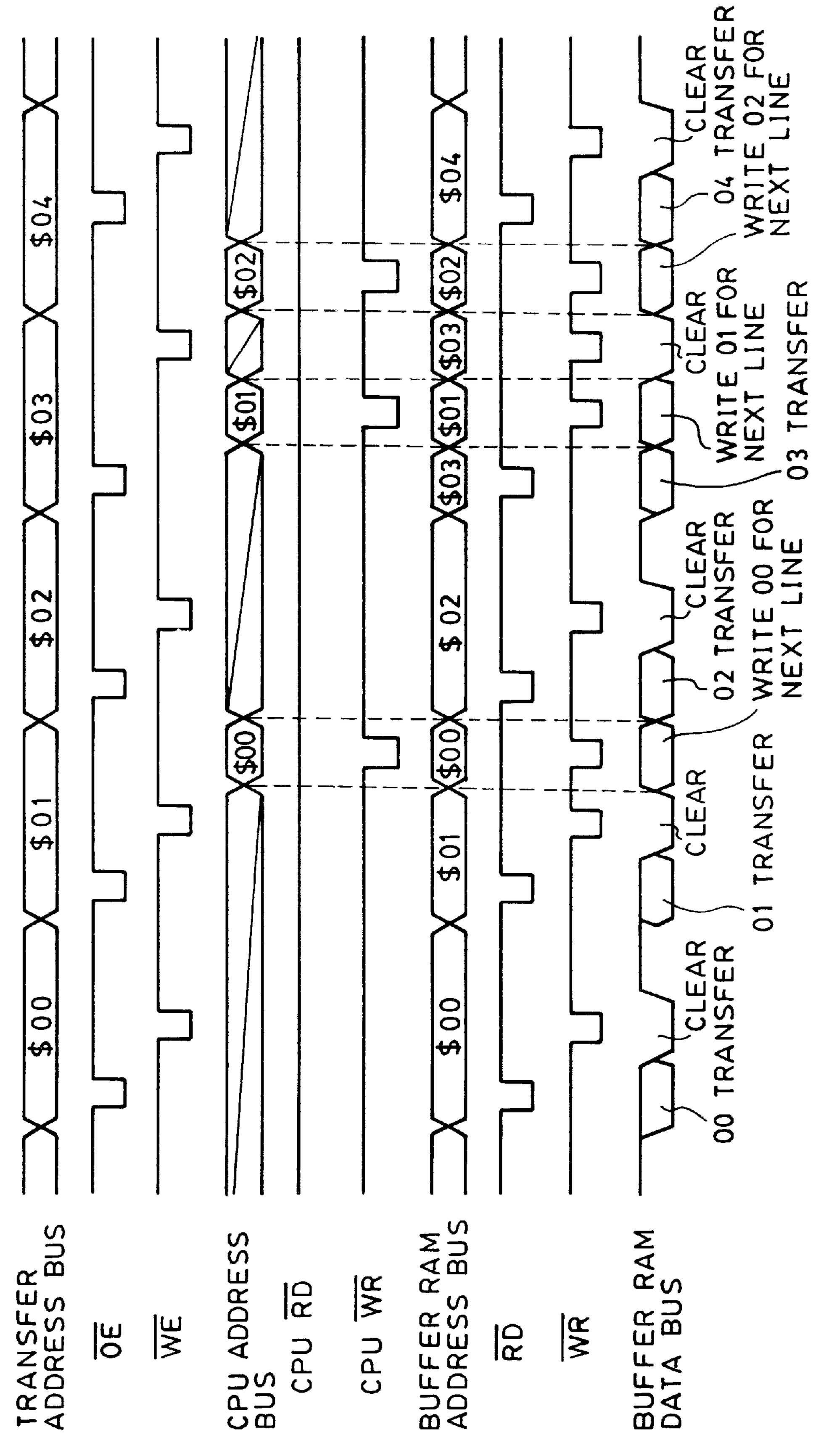
FIG. 14 is a signal timing chart with respect to the buffer RAM.

FIG. 14 is a timing chart of the address/data-bus signals and $\overline{\text{RD}}$/$\overline{\text{WR}}$ signals in the buffer RAM 120. The transfer address bus signal is generated from the address counter 201, and $\overline{\text{OE}}$ and $\overline{\text{WE}}$ signals are generated from the printing pulse generator 206. The CPU address bus signal and the CPU $\overline{\text{RD}}$/$\overline{\text{WR}}$ signals are generated by access from the CPU 100. These two accesses are selected by means of the switching device 203 and output to the buffer RAM address bus and the terminals $\overline{\text{RD}}$ and $\overline{\text{WR}}$ of the buffer RAM 120. Data from/to the buffer RAM 120 is selected by the switching device 207 and selectively input/output to the printing pulse generator 206 or the CPU.

As shown in FIG. 14, when recording is performed at a fixed position in the scanning direction, the addresses of the buffer area where data to be printed is stored are successively designated and the data concerned is output so as to sequentially output the signals COM1~8, and, as shown in FIG. 9, the signals SEG1~8 are output in correspondence with the printing data and at a timing in synchronism with the signals COM1~8, thereby performing recording.

Further, after transferring the data of the designated addresses, data is cleared with respect to those addresses. That is, by writing "00", data clearing is effected in the area in the previous line where printing has been completed. Accordingly, when the writing of the next-line data is performed with respect to an address prior to the transfer address being executed, it is possible to omit the unnecessary writing of the next-line development data, that is, the writing to a section where there is no data (a blank section). This is due to the fact that the buffer RAM 120 has been cleared in the "clear" portion of the buffer RAM data bus in FIG. 14. That is, by supplying clear data in synchronism with the signal $\overline{\text{WR}}$ from the printing pulse generator 206 to the buffer RAM data bus, the data "00" is written to the same address as that of the printing data previously read out, thus effecting clearing.

(Second Embodiment)

In this embodiment, the address counter 201 consists of an up/down counter. This makes it possible to perform printing not only in the normal direction, i.e., from the left to the right, but also in the reverse direction, i.e., from the right to the left.

For example, a scanning direction switching signal supplied from the CPU 100 is added and the counting direction of the address counter 201 is changed in accordance with the signal, thereby changing the order in which the data from the recording data buffer is read out. This makes it possible to perform a bi-directional printing.

(Third Embodiment)

While in the First Embodiment the clearing after the transfer data read-out is effected by writing "00", the clearing in this embodiment is effected by writing a fixed value. Due to this arrangement, it is possible to complete the setting of the printing development data of the next line by the time the printing of one line is terminated by previously setting data to be printed in the next line in the printing pulse generator 206. By keeping this value constant, the circuit configuration can be simplified.

Further, though in the above-described embodiments an ink jet recording apparatus was employed as the printing apparatus, the same effect can be obtained with a thermal transfer recording apparatus. That is, the same effect as described above can be obtained through replacement by serial data and shift clocks, latch signals, etc. by adapting the structure of the printing pulse generator to a timing for a thermal head.

The present invention brings about excellent effects particularly in a recording head and a recording device of the ink jet system using thermal energy among the ink jet recording systems.

As to its representative construction and principle, for example, those practiced by use of the basic principle disclosed, for instance, in U.S. Pat. Nos. 4,723,129 and 4,740,796 are preferred. The above system is applicable to either one of the so-called on-demand type and the continuous type. Particularly, the case of the on-demand type is effective because, by applying at least one driving signal which gives rapid temperature elevation exceeding nucleate boiling corresponding to the recording information on electrothermal converting elements arranged in a range corresponding to the sheet or liquid channels holding a recording liquid (ink), heat energy is generated by the electrothermal converting elements to effect film boiling on the heat acting surface of the recording head, and consequently the bubbles within the liquid (ink) can be formed in correspondence to the driving signals in one to one correspondence. By discharging the liquid (ink) through a discharge port by growth and shrinkage of the bubble, at least one droplet is formed. By forming the driving signals into pulse shapes, growth and shrinkage of the bubble can be effected instantly and adequately to accomplish more preferable discharging of the liquid (ink) particularly with excellent image characteristics. As exemplary driving signals of such pulse shapes, the signals as disclosed in U.S. Pat. Nos. 4,463,359 and 4,345,262 are suitable. Further, excellent recording can be performed by using the conditions described in U.S. Pat. No. 4,313,124 which concerns the temperature elevation rate of the above-mentioned heat acting surface.

Further, apart from an image output terminal device of an information processing apparatus such as a computer, the ink jet recording apparatus of the present invention may be usable in a copying machine combined with a reader or the like, or a facsimile apparatus having a transmitting/receiving function.

In accordance with the present invention, it is possible for the CPU to concentrate on data conversion for the next line while the printing of one line is being performed. Further, the development data on the next line can be written to an address where printing has been completed, so that an improvement is attained in terms of printing throughput. Further, it is possible to cope with high-speed recording by the printer, and an increase in cost can be avoided.

The individual components shown in outline or designated by blocks in the drawings are well-known in the image recording arts and their specific construction and operation are not critical to the operation or best mode for carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus comprising:

a recording head for recording images on a recording medium in accordance with recording data;

an addressable memory for storing the recording data to be supplied to said recording head;

address generating means for generating, with respect to said addressable memory, sequential transfer addresses synchronized with recording performed by said recording head;

data reading means for reading out the recording data stored in said addressable memory on a basis of the sequential transfer addresses generated by said address generating means; and data writing means for supplying clear data and for writing the supplied clear data in said addressable memory for each address from which recording data is read for clearing each address from which recording data is read, said data writing means writing the clear data during a same transfer address cycle as a cycle in which the recording data is read from a respective location, so that the clear data is written on a basis of identical addresses as the addresses where the recording data was read.

2. A recording apparatus according to claim 1, wherein the addresses are generated in a predetermined period, the recording data is read out in the predetermined period, and the predetermined data is written in the predetermined period.

3. A recording apparatus according to claim 1, wherein said apparatus is comprised in an electronic typewriter having a character processing function.

4. A recording apparatus according to claim 1, wherein said apparatus is comprised in output terminals of computer systems.

5. A recording apparatus according to claim 1, wherein said apparatus is comprised in a copying machine having a reader.

6. A recording apparatus according to claim 1, wherein said apparatus is comprised in a facsimile machine having transmitting and receiving functions.

7. A recording apparatus according to claim 1, wherein the clear data is all zero data.

8. A recording apparatus according to claim 1, further comprising means for scanning said recording head, wherein said recording head performs recording while scanning in a fixed direction with respect to the recording medium.

9. A recording apparatus according to claim 8, wherein said addressable memory comprises a line memory which stores one line of the recording data.

10. A recording apparatus according to claim 1, wherein said recording head ejects ink from discharge ports in accordance with the recording data.

11. A recording apparatus according to claim 10, wherein said recording head includes heat energy generating means provided in said discharge ports for thermally generating changes in a state of the ink so that ink is ejected from said discharge ports in accordance with the changes in state so as to form flying liquid droplets.

12. A recording controller which supplies recording data to a recording head, said controller comprising:

an addressable buffer memory for storing the recording data;

an address counter for generating sequential transfer addresses corresponding to recording positions with respect to said buffer memory;

a read-out circuit for reading the recording data from said addressable buffer memory in accordance with the sequential transfer addresses generated by said address counter;

an output circuit for supplying the recording data read out by said read-out circuit to said recording head; and a writing circuit for supplying clear data and for writing the supplied clear data in said addressable buffer memory for each address from which data is read for clearing each address from which recording data is read, said writing circuit writing the clear data during a same transfer address cycle as a cycle in which the recording data is read from a respective location, so that the clear data is written on a basis of identical addresses as the addresses where the recording data was read.

13. A recording controller according to claim 12, wherein said addressable memory comprises a line memory which stores one line of the recording data.

14. A recording apparatus according to claim 12, wherein said read-out circuit reads the recording data by supplying read-out signals to said addressable memory.

15. A recording controller according to claim 12, wherein said writing circuit writes the predetermined data by supplying writing signals to said addressable memory.

16. A recording controller according to claim 12, wherein the addresses are generated in a predetermined period, the recording data is read out in the predetermined period, and the predetermined data is written in the predetermined period.

17. A recording controller according to claim 12, wherein said controller is comprised in an electronic typewriter having a character processing function.

18. A recording controller according to claim 12, wherein said controller is comprised in output terminals of computer systems.

19. A recording controller according to claim 12, wherein said controller is comprised in a copying machine having a reader.

20. A recording controller according to claim 12, wherein said controller is comprised in a facsimile machine having transmitting and receiving functions.

21. A recording controller according to claim 12, wherein the clear data is all zero data.

22. A recording controller according to claim 12, further comprising a CPU for supplying the addresses to said addressable memory and for writing the recording data in said addressable memory.

23. A recording controller according to claim 22, further comprising:

an address bus selector being provided between said address counter and a buffer RAM, said address bus selector selecting a transfer address bus of said address counter and a CPU address bus of said CPU and being connected to a memory address bus of said addressable buffer memory; and a data bus selector being provided between said output circuit and said addressable memory, said data bus selector selecting a transfer data bus of said output circuit and a CPU data bus of said CPU and being connected to a memory data bus of said addressable memory.

24. A recording controller according to claim 12, further comprising means for scanning said recording head, wherein said recording head performs recording while scanning in fixed directions with respect to a recording medium.

25. A recording controller according to claim 24, wherein said address counter generates the addresses in synchronism with scanning movement of said recording head.

26. A recording controller according to claim 25, wherein said address counter is an up/down counter which performs one of counting up and counting down in accordance with the direction in which said recording head moves.

27. A recording controller according to claim 12, wherein said recording head ejects ink from discharge ports in accordance with the recording data.

28. A recording controller according to claim 27, wherein said recording head includes heat energy generating means provided in said discharge ports for thermally generating changes in the state of the ink so that the ink is ejected from said discharge ports in accordance with the changes in state so as to form flying droplets.

29. A recording method in which images are recorded on a recording medium with a recording head, said method comprising the steps of:

supplying sequential transfer addresses to an addressable memory for storing recording data;

reading the recording data from the addressable memory on a basis of the sequential transfer addresses supplied;

supplying the read recording data to said recording head to perform recording on the recording medium;

supplying clear data; and writing the supplied clear data in the addressable memory for each address from which recording data is read for clearing each address from which recording data is read, said writing being performed during a same transfer address cycle as a cycle in which the recording data is read from a respective location, so that the clear data is written in accordance with addresses which are identical to the addresses sequentially supplied.

30. A recording method according to claim 29, further comprising the step of writing the recording data in an address of the addressable memory in which the predetermined data has been written.

31. A recording method according to claim 29, wherein the recording head performs recording while scanning in fixed directions with respect to the recording medium.

32. A recording method according to claim 29, wherein the buffer memory comprises a line memory which stores one line of the recording data.

33. A recording method according to claim 29, wherein the addresses are generated in a predetermined period, the recording data is read in the predetermined period, and the predetermined data is written in the predetermined period.

34. A recording method according to claim 29, wherein the clear data is all zero data.

35. A recording method according to claim 29, wherein the recording head ejects ink from discharge ports in accordance with the recording data.

36. A recording method according to claim 35, wherein the recording head includes heat energy generating means provided in the discharge ports for thermally generating changes in a state of the ink so that the ink is ejected from the discharge ports in accordance with the changes in state so as to form flying droplets.

37. A recording apparatus comprising:

a recording head for recording images on a recording medium in accordance with recording data;

an addressable memory for storing the recording data to be supplied to said recording head;

address generating means for sequentially generating addresses corresponding to respective locations in said addressable memory, the generation of addresses being synchronized with the recording performed by said recording head;

data reading means for reading out the recording data stored in said addressable memory at the locations corresponding to the sequential addresses generated by said address generating means; and data writing means for supplying clear data and for writing the supplied clear data to each location in said addressable memory following reading out of the recording data stored in the respective location and prior to reading out of the recording data stored in another location for clearing the recording data in each location in said addressable memory.

* * * * *

UNITED STATES PATENT AND TRADEMARK OFFICE

CERTIFICATE OF CORRECTION

PATENT NO. : 5,963,223

DATED : October 5, 1999

INVENTOR(S) : JIRO TATEYAMA, ET AL.

It is certified that error appears in the above-identified patent and that said Letters Patent is hereby corrected as shown below:

On the Cover Page:
Please insert the following:
--[*] Notice: This patent issued on a continued prosecution application filed under 37 CFR 1.53(d), and is subject to the twenty year patent term provisions of 35 U.S.C. § 1.54(a)(2).--.

Sheet 6 of the Drawings:
Figure 8, "COMON" should read --COMMON--.

COLUMN 2:
Line 41, "clear" should read --clear data--.

COLUMN 5:
Line 11, "constitute" should read --constitutes--.
Line 66, should not be indented.

COLUMN 11:
Line 45, "apparatus" should read --controller--.

Signed and Sealed this

Seventeenth Day of October, 2000

Attest:

Q. TODD DICKINSON

*Attesting Officer* *Director of Patents and Trademarks*